(12) United States Patent
Hopper

(10) Patent No.: US 6,866,253 B1
(45) Date of Patent: Mar. 15, 2005

(54) DURABLE HORSE FENCE

(76) Inventor: Joel S. Hopper, 1744 Co. Rt. 24, Edwards, NY (US) 13635

(*) Notice: Subject to any disclaimer, the term of this patent is extended or adjusted under 35 U.S.C. 154(b) by 0 days.

(21) Appl. No.: 10/778,252

(22) Filed: Feb. 17, 2004

Related U.S. Application Data

(63) Continuation of application No. PCT/US04/01919, filed on Jan. 23, 2004.
(60) Provisional application No. 60/442,254, filed on Jan. 27, 2003.

(51) Int. Cl.[7] ............................................. E04H 17/14
(52) U.S. Cl. .............................. 256/65.09; 256/65.02; 256/65.15; 256/10; 403/2
(58) Field of Search ................ 256/59, 65.01, 256/65.02, 65.09, 65.15, 10, 47, 50; 403/2; 411/2, 301–304

(56) References Cited

U.S. PATENT DOCUMENTS

| | | | |
|---|---|---|---|
| 2,386,129 A | 10/1945 | Maack | |
| 2,618,685 A | 11/1952 | Lewis | |
| 3,104,866 A | 9/1963 | MacDonald | |
| 3,554,494 A | 1/1971 | Bee | |
| 3,654,383 A | * 4/1972 | Wilson | |
| 3,820,758 A | * 6/1974 | Berg, Jr. et al. | 256/10 |
| 4,077,611 A | * 3/1978 | Wilson | 256/10 |
| 4,324,388 A | 4/1982 | Klaser | |
| 4,436,273 A | * 3/1984 | Yuda et al. | 403/2 X |
| 4,767,232 A | * 8/1988 | Francis | |
| 5,277,408 A | * 1/1994 | Parker | 256/65.02 |
| 5,469,682 A | * 11/1995 | Knight | 256/59 X |
| 5,556,079 A | 9/1996 | West | |
| 5,660,376 A | 8/1997 | West | |
| 5,683,074 A | * 11/1997 | Purvis et al. | 256/59 X |
| 5,772,186 A | * 6/1998 | Parker | 256/65.02 |
| 5,803,438 A | 9/1998 | Blouin | |
| 5,992,828 A | 11/1999 | Burdick | |
| 6,010,117 A | * 1/2000 | Doxey | 256/65.01 X |
| 6,036,177 A | * 3/2000 | Kirkwood, Jr. | 256/59 |
| 6,179,274 B1 | 1/2001 | Irwin, III | |
| 6,296,233 B1 | * 10/2001 | Berg et al. | 256/10 X |
| 6,467,756 B1 | 10/2002 | Elsasser | |
| 6,583,363 B1 | * 6/2003 | Wilson, Jr. | 256/10 X |
| 2003/0155565 A1 | * 8/2003 | Cantley | |

* cited by examiner

Primary Examiner—John R. Cottingham
Assistant Examiner—Ryan M. Flandro
(74) Attorney, Agent, or Firm—Cermak & Kenealy; Adam J. Cermak

(57) ABSTRACT

A rail (100, 100') is formed with ends (102, 104) configured so that they can be placed together and mounted to the post (P) of a fencing system. A breakaway feature (122, 124, 126) permits the rail to break free of the post (P) when a threshold level of force is applied to the rail. Two adapters (200) can be attached to a stock rail (R) to form a breakaway rail.

11 Claims, 6 Drawing Sheets

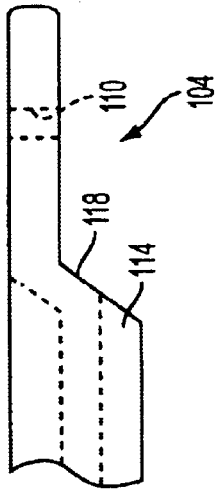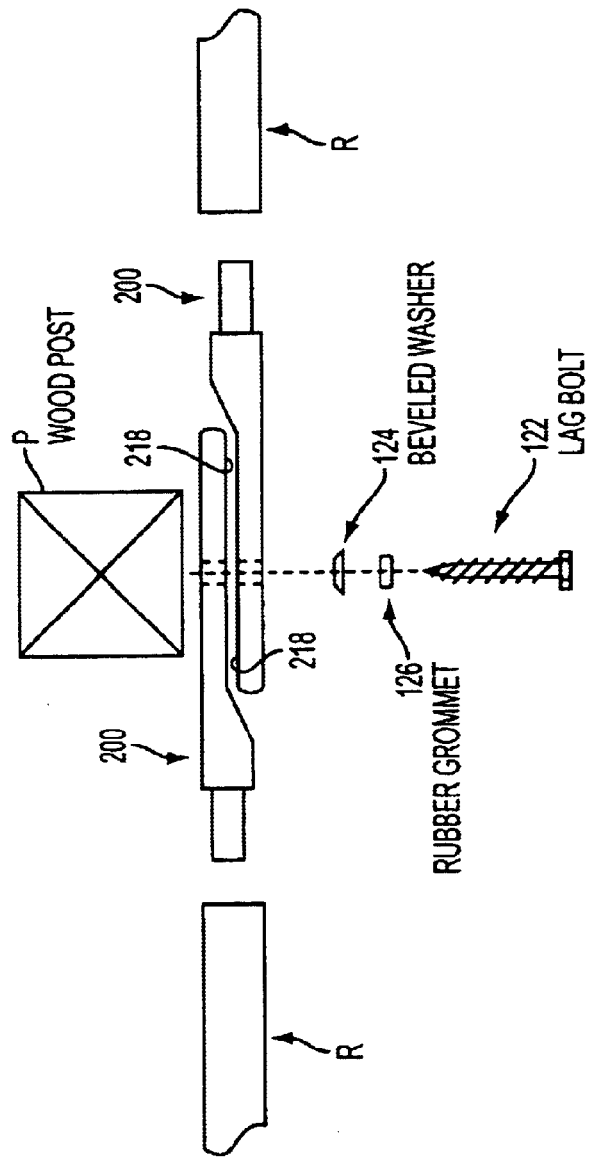

DURABLE HORSE FENCE

This application is a Continuation of International application number PCT/US04/001919, filed 23 Jan. 2004, and claims priority to U.S. provisional application No. 60/442,254, "Equi-fence, durable horse fence", by Joel S. Hopper, filed 27 Jan. 2003, the entireties of both of which are incorporated by reference herein.

BACKGROUND OF THE INVENTION

1. Field of the Invention

The present invention relates to outdoor fencing systems, and more specifically to breakaway fencing systems.

2. Brief Description of the Related Art

Horse owners have experienced many of the problems associated with horses, pastures, and some of the fence products that are available on today's market. Horse fencing needs to meet many requirements: it needs to be visible under a variety of weather conditions, day and night; resistant to many types of climate; easily installed; easily repaired; and safe for the horses.

Many different types of fencing have been used in the past, including barbed wire, smooth wire, poly-rope with woven wire, wood plank, and vinyl fencing. Each of the prior fencing systems has advantages and disadvantages. It is inevitable that at some point a horse will test a fence or be spooked and run through it. Many prior fences have not performed well in these critical situations, causing injury to the horse when the horse comes into contact with the fence or breaks through the fence, and/or causing extensive damage to the fence which requires significant outlays in time and money to repair.

There has remained a need, therefore, for a fence or fencing system that is relatively inexpensive to install and repair, functional as well as pleasing to look at, and very importantly, safe for the horses it contained.

SUMMARY OF THE INVENTION

According to a first aspect of the invention, a fence rail comprises a first end having a hole extending laterally therethrough, a second end having a hole extending laterally therethrough, and a middle section extending between the first end and the second end, the middle section defining a longitudinal axis, wherein one of the first end and the second end is laterally offset from the longitudinal axis.

According to another aspect of the present invention, a breakaway fencing system comprises a rail in accordance with the first aspect of the invention, a first, deformable element positioned in a hole in one end of said rail, a second, force transmitting element extending through said first element and including a force transmitting portion that bears against the first element, wherein, when the second element is secured to a fence post and when a lateral force of a predetermined magnitude acts on the rail, the first element deforms and permits the force transmitting portion of the second element to pass through the first element and release the rail.

According to another aspect of the present invention, an adapter system useful for construction a fence system comprises an adapter including a first end having a hole extending laterally therethrough, a second end, and a middle section extending between the first end and the second end, the middle section defining a longitudinal axis, wherein the first end is laterally offset from the longitudinal axis.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which:

FIG. 14 illustrates an enlarged top plan view of portions of a fencing system, as may be attached to a post and rails in accordance with the present invention.

FIG. 15 illustrates an enlarged top plan view of an end of the embodiment illustrated in FIG. 2.

DETAILED DESCRIPTION OF THE PREFERRED EMBODIMENTS

Figure 1:
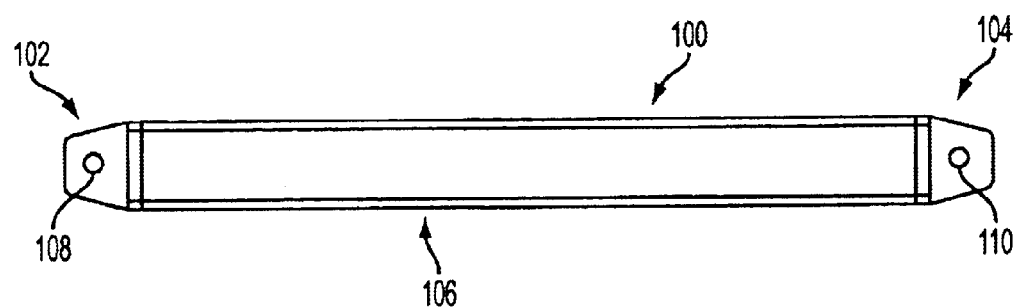
FIG. 1 illustrates a side elevational view of a first exemplary embodiment of a rail in accordance with the present invention.
Figure 2:
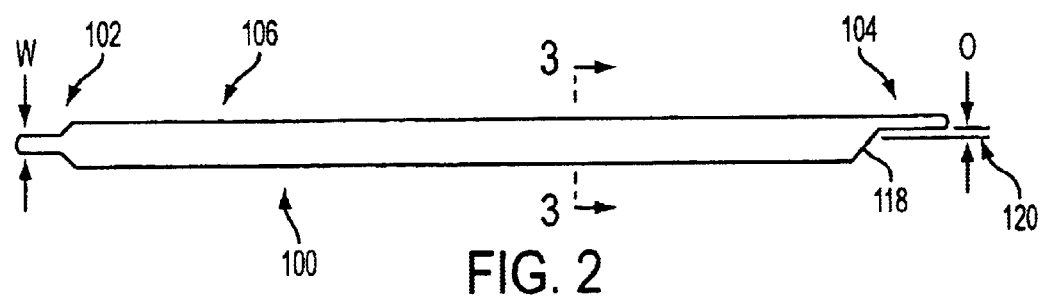
FIG. 2 illustrates a top plan view of the first exemplary embodiment of a rail in accordance with the present invention.

Referring to the drawing figures, like reference numerals designate identical or corresponding elements throughout the several figures.

In general terms, a fence and fence system of the present invention contains livestock, e.g., horses, but also causes less injury should the horse run into it. Should the fence be knocked down, it can be easily re-installed at a minimal loss of material and expense. Because of the unique fastening system of the present invention, the fence installs quickly, allows the fencing to follow the contour of the terrain and allows for movement of the fence post due to frost without damaging the connection between the rails and the post. A fence in accordance with the present invention is easily installed on a variety of fence posts, durable, cost effective, easily repaired and above all, safe.

The fence system of the present invention can be used for fencing for containing any suitable livestock or for decorative use as well. Another aspect of the present invention is that it can be manufactured to replicate wooden plank rail fencing. It offers ease of installation, safety, durability, and can be constructed in one or more colors, e.g. white to simulate painted plank rails, and brown to simulate stained plank rails. A fence of the present invention can be used alone or in conjunction with snap-on clips of the present invention that allow the installation of smooth wire along the top or bottom of each rail. Fence components of the present invention can installed on any shape, e.g., round or square wooden fence posts, as well as fence posts of other materials. The rails are preferably, but not necessary, made of molded plastic that is colored throughout and therefore never needs painting or staining.

Turning now to the drawing figures, FIGS. 1–4 illustrate several views of a first exemplary embodiment of a rail in accordance with the present invention. The rail 100 includes a first end 102, a second end 104, and a middle section 106 between the first and second ends. Each of the first end 102 and the second end 104 preferably include a through hole 108, 110, respectively, included for reasons explained in greater detail below.

Figure 3:
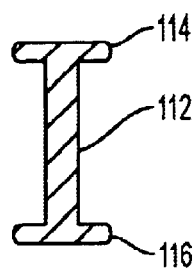
FIG. 3 illustrates a sectional view taken at line 3—3 in FIG. 2.
Figure 4:
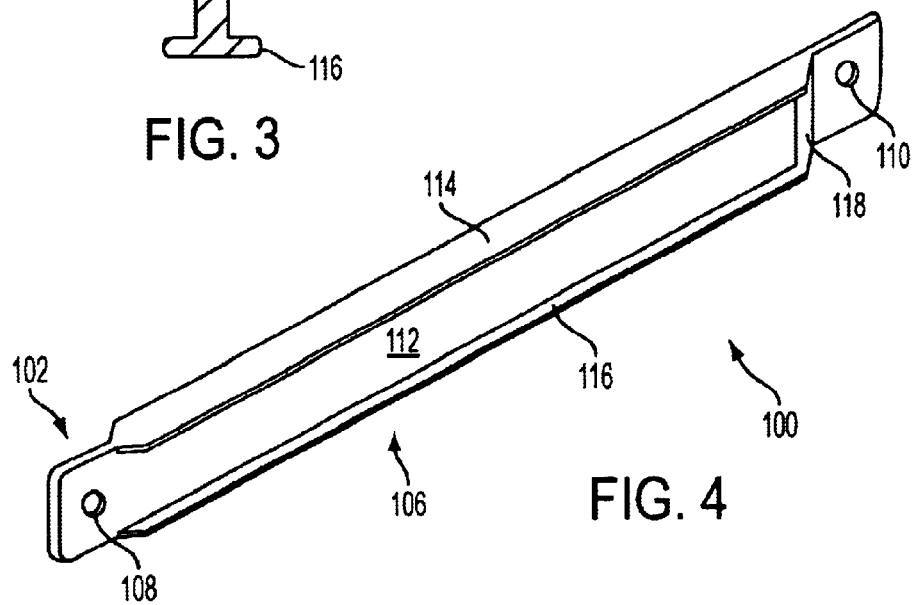
FIG. 4 illustrates a perspective view of a first exemplary embodiment of a rail in accordance with the present invention.

The cross-sectional shape of the rail 100 is selected so that the rail can bend or deflect relatively easily when a lateral force acts on the rail, and is relatively more stiff in response to forces acting on the top and/or bottom of the rail, e.g., gravity when the rail is installed with it's longitudinal axis 120 parallel to the ground. By way of example and not of limitation, the cross-sectional shape of the rail, as illustrated at FIG. 3, may be similar to that of an I-beam, which satisfies the functional requirements described above; other cross-sectional shapes are also useful, and the present invention is not restricted to an I-beam cross sectional shape. When the rail 100 has an I-beam cross sectional shape, the rail can include a top portion 114, a bottom portion 116, and a web 112 connecting the top and bottom portions. To save material and reduce weight, web 112 can be formed with holes or to include a lattice, as well understood to those of ordinary skill in the art.

One aspect of the present invention includes that the ends 102, 104 of the rail 100 are not mirror images of each other; one embodiment of this aspect is illustrated in FIGS. 1–4. Preferably, end 102 is roughly centered on the axis 120, while end 104 is offset laterally from the axis 120 an amount sufficient for an end 102 of another rail 100 to nest with the end 104 without causing significant deflection of either end 102 or end 104. Stated somewhat differently, the width W of the end 102 is about ½ the offset O of the end 104 from the axis 120 (see FIG. 2), so that the longitudinal axes of two joined rails will substantially coincide. To assist in forming this geometry, the end 104 of the rail 100 includes a slanted web portion 118 which connects the end 104 to the web 112 of the middle section 106 of the rail (see FIG. 15).

While less preferred, another aspect of the present invention includes that the cross-sectional shape of the rail 100 is substantially rectangular, including a square cross-section, round, or any other geometry.

Figure 5:
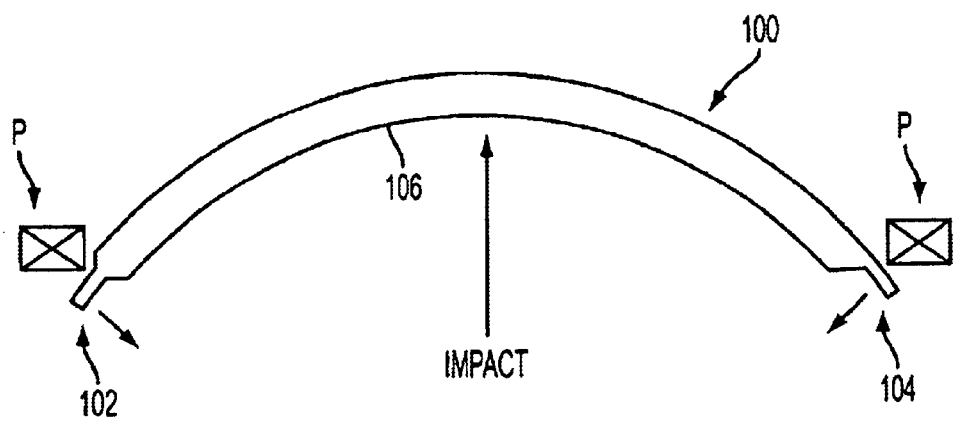
FIG. 5 schematically illustrates an exemplary rail of the present invention disengaging or breaking away from two posts of a fencing system in accordance with the present invention.

FIG. 5 illustrates how a rail in accordance with the present invention can react when a lateral force or impact acts on the middle section 106 of the rail 100, e.g., by an animal, e.g. a horse, runs into the fence. The rail 100 is attached at ends 102, 104 to two spaced apart posts P of any configuration. Because of the flexibility of the rail 100, and the breakaway attachment features of the present invention which connect the rail to the posts, the rail deflects laterally in reaction to the impact. When a predetermined amount of deflection is caused by the impact, the breakaway features of the present invention separately release each end 102, 104 of the rail 100 from the posts P. Thus released, the rail 100 is then partially or fully detached from the posts P, without breaking the rail, and importantly without exposing the animal to harm from a broken fence.

Figure 6:
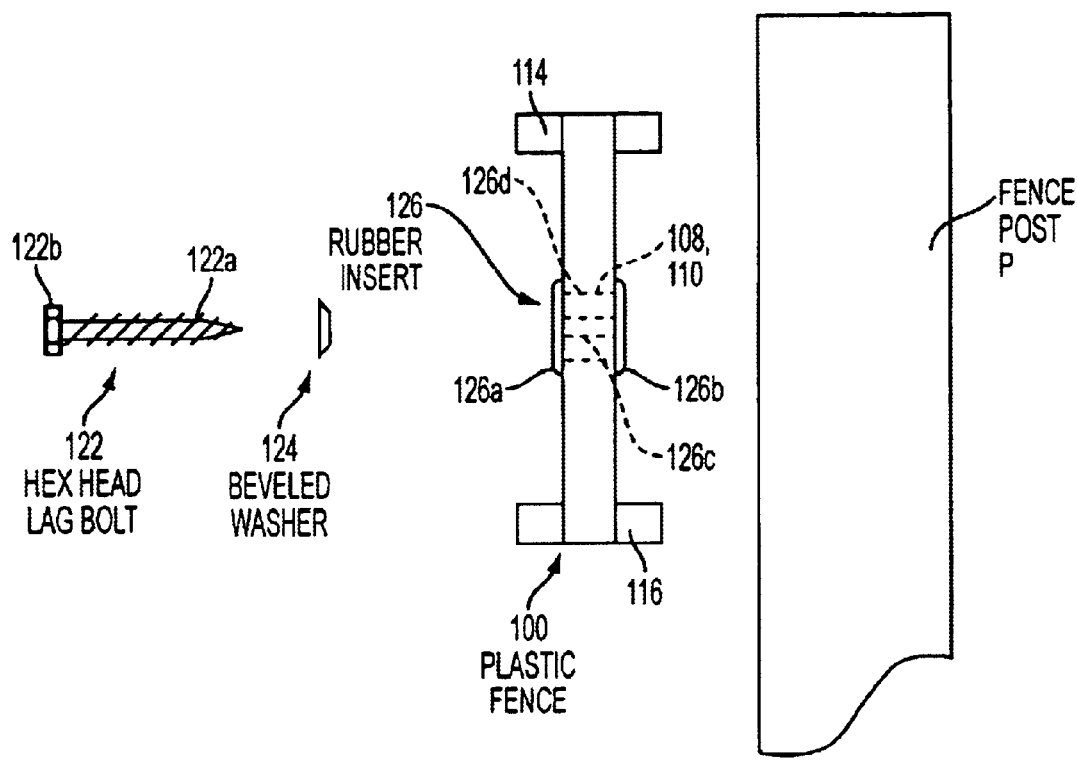
FIG. 6 illustrates an exploded view of portions of the first exemplary embodiment.

FIG. 6 illustrates an exemplary embodiment of a breakaway feature, which is yet another aspect of the present invention. The holes 108, 110 of the ends 102, 104 of the fence rail 100 are illustrated in broken line. A grommet, rubber insert, or similar flexible, preferably tubular element 126, is mounted in each hole 108, 110. The insert 126 includes a tubular body 126d, two end flanges 126a, 126b, which are laterally larger than the body 126d, and a through hole or bore 126c extending between the body and flanges. A screw or bolt 122, e.g. a lag bolt, has a shank 122a sized to pass through the bore 126c of the insert 126. A beveled washer 124 can be provided so that the head 122b of the bolt 122 can apply force to the flange 126a of the insert 126, or the head of the bolt can be sized to bear directly against the flange. In either embodiment, the inner diameter of the hole 108, 110 is larger than the outer diameter of the head 122b or the beveled washer 124, and the inner diameter of the bore 126c is smaller than the outer diameter of the head or washer. With the foregoing selection of relative dimensions, the bolt 122 can apply force via the bolt head and/or washer, through the insert 126 and the flange 126a to the rail 100, and to the post P through the threads on the bolt when screwed into the post. Less preferably, the bolt 122 can extend completely through a hole in the post P (not illustrated), and can be attached on one or both ends of the bolt by nuts (not illustrated).

As the rail 100 is bent and flexes, the fence is configured to pull free from the inserts 126 where the fence rail is fastened at the post P. The rails of the present invention are thus designed with sufficient stiffness to prevent them from coming off the post P unless they are severely deflected; normal pushing and rubbing against the fence will not be sufficient to dislodge the rail. This aspect of the present invention is safer to horses or other livestock. Instead of broken wooden rails with sharp and jagged edges resulting in injuries, the rail will pull free if run into and can be replaced with minimal repairs.

Figure 8:
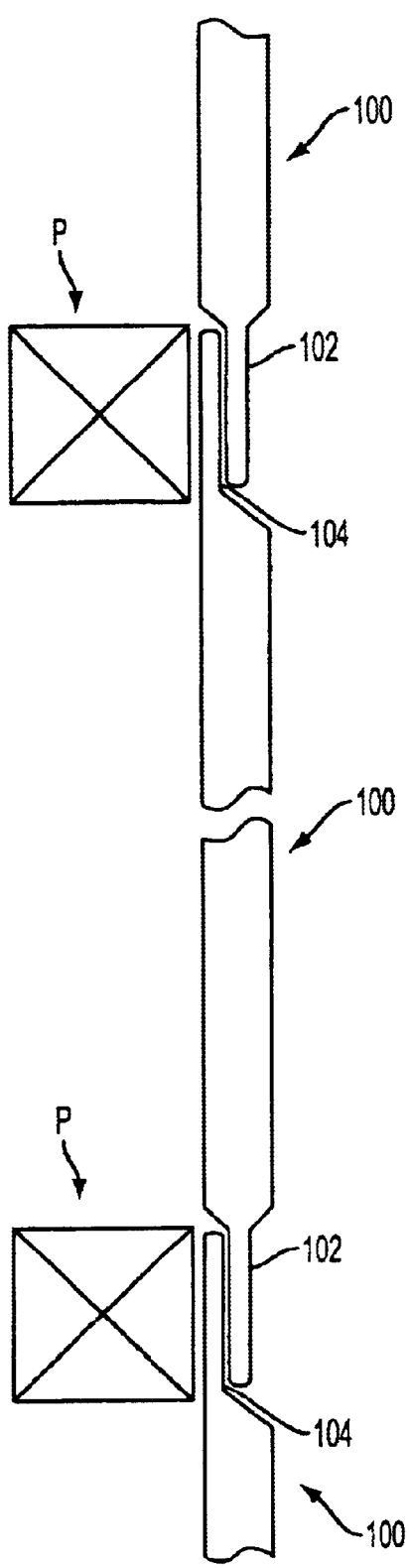
FIG. 8 illustrates a top plan view of the first exemplary embodiment of a fencing system in accordance with the present invention.

Turning back to FIG. 6, which shows how the rails of the present invention can be connected to the posts P according to an exemplary embodiment of the present invention. After setting the posts P in the ground at specified distances, the rails 100 are simply installed using, e.g., a cordless drill and by screwing the (for example) hex head lag bolt 126 thru the beveled washer and into the post. The inserts 126 are preferably, but not necessarily, installed prior to screwing the rail to the post. As illustrated in FIG. 8, and described above with reference to FIGS. 1–4, the rails 100 have ends 102, 104 that allow them to overlap at the post P, with a single bolt or screw 126 extending through both ends 102, 104. Because the rails are fastened at only one point on the post the rails are easily adapted to following the contour of the land they are installed on. This also allows for movement of the rails from frost and other natural causes.

Figure 7:
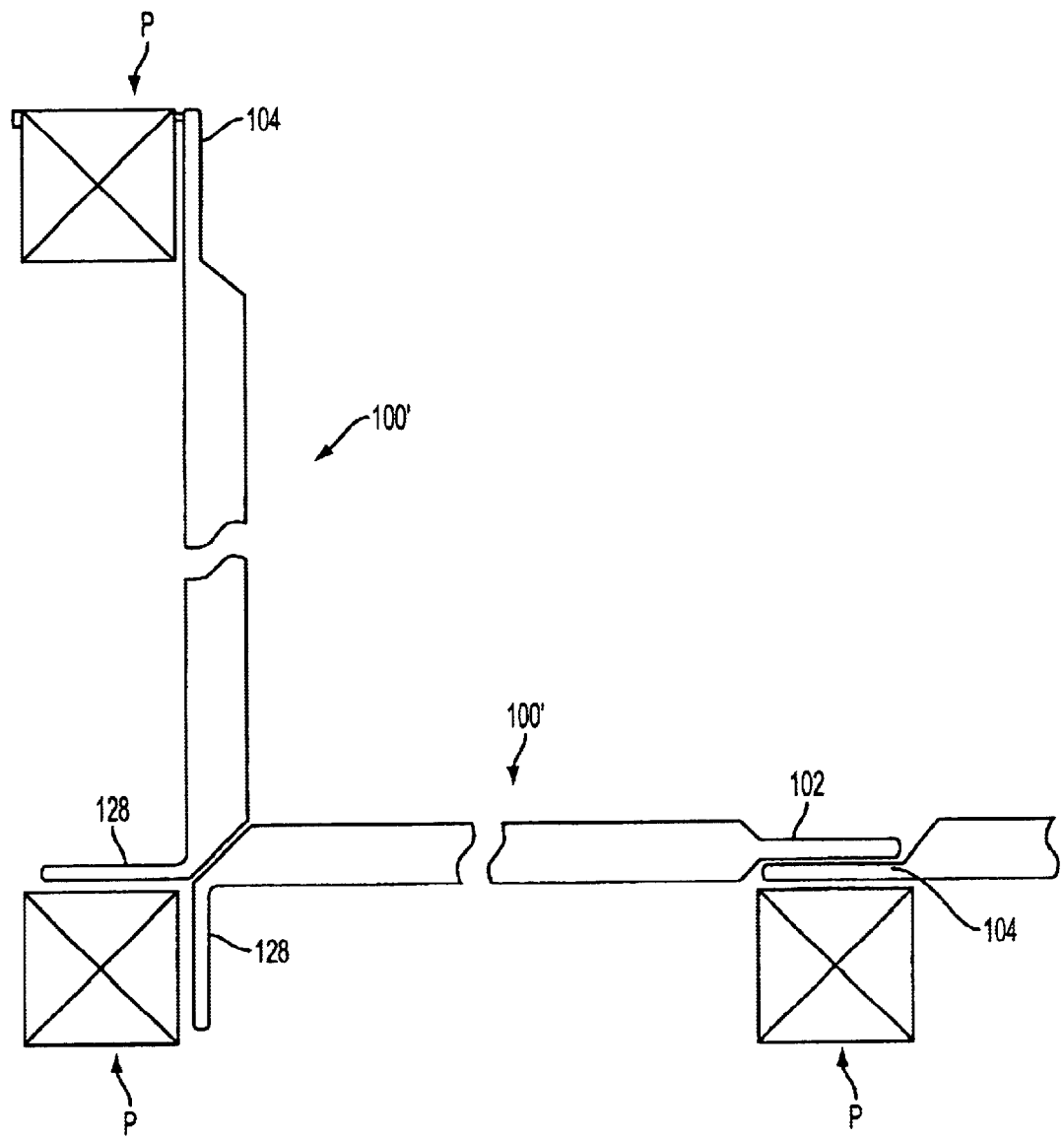
FIG. 7 illustrates a top plan view of a second exemplary embodiment of a fencing system in accordance with the present invention.

FIG. 7 illustrates another aspect of the present invention, a top plan view of corner rails 100'. Standing inside the fenced enclosure, the corner rails designated as either left or right corner rails, and are configured as either 90 degree or 45 degree angle from the corner post P. The corner rails 100' are in most aspects the same as rails 100, except that the ends 104 are replaced with ends 128. Ends 128 are essentially the same as ends 104, except that they extend perpendicular to (90 degree version) and away from the axis 120 of the rail 100, so two such corner rails 100' can be mounted to a single post P, as suggested in FIG. 7.

Figure 9:
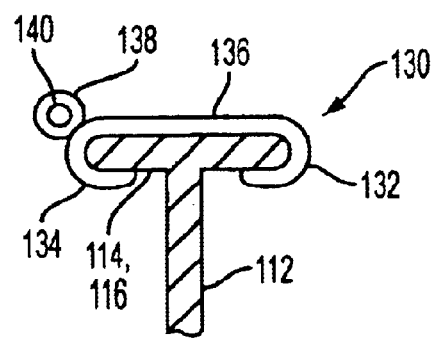
FIGS. 9 and 10 illustrate two exemplary embodiments of wire clips in accordance with the present invention.
Figure 10:
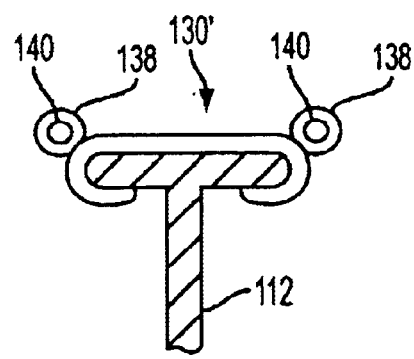

FIGS. 9 and 10 illustrate two embodiments of accessory clips in accordance with the present invention, which allow installation of smooth wire that can be electrified for added security for horses or other livestock. The clip 130 in FIG. 9 is a single-wire clip which allows installation of a single strand of wire on either the top or bottom of each rail on the side away from the posts, while the clip 130' in FIG. 10 is a double-wire clip designed to allow installation of two strands of wire. Use of the double-wire clips 130' is preferably for the top rail of a fence system only, and does not allow the post to protrude any higher than a small distance above the top of that rail.

The clip 130 is generally C-shaped, and includes a curved first end 132, a middle portion 136, and a curved second end 134, which are together sized to receive a top 114 or bottom 116 of a rail 100. A ring or loop 138 is mounted, formed integral with, or otherwise attached to one of the ends 132, 134, and preferably extends laterally beyond the end to which it is attached, so that a wire secured in the ring 138 can more easily make contact with an animal contained in the fence system. A cut or the like 140 optionally is formed in the ring 138 to assist in placing a wire (not illustrated) in the ring. The clip 130' includes two such rings 138, one ring positioned on each of the ends 132, 134.

Figure 11:
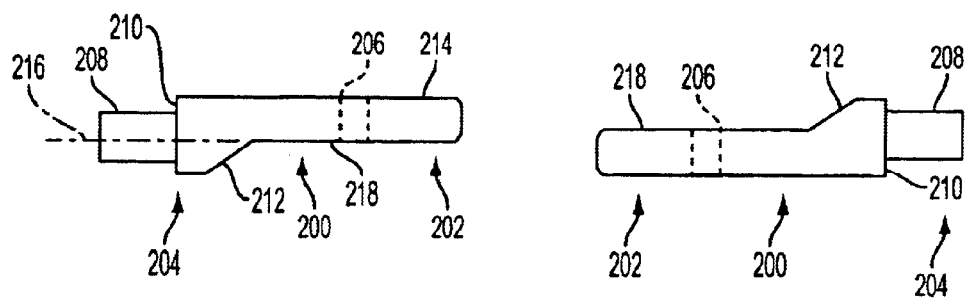
FIG. 11 illustrates a top plan view a third exemplary embodiment in accordance with the present invention.
Figure 12:
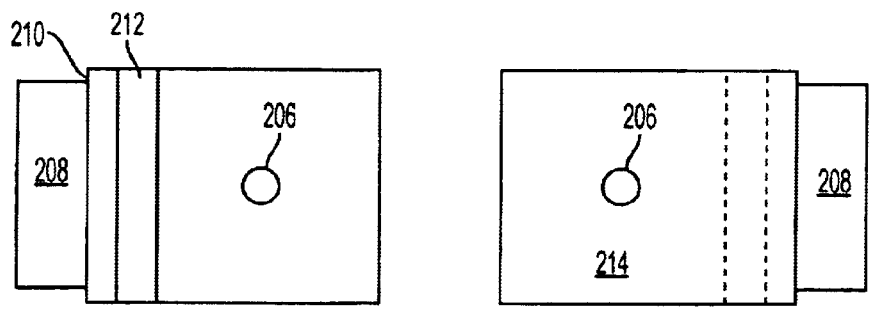
FIG. 12 illustrates a side elevational view of the third exemplary embodiment.

FIGS. 11 and 12 illustrate yet another exemplary embodiment in accordance with the present invention. The embodiment illustrated in FIGS. 11 and 12 is somewhat similar to the embodiments described above with reference to FIGS. 1–10, and therefore many of the similarities will not be repeated so as not to obscure the present invention. Instead of full rails 100, 100', rail adapters 200 of the present invention can be used with common building materials or rail stock to form a rail and a fencing system in accordance with the present invention. FIGS. 11 and 12 illustrate two adapters 200 in an orientation which reveals how they can be used to form rails and fencing systems. An adapter 200 includes a post mounting end 202 and a rail attachment end 204. The end 202 includes a through hole or bore 206 similar to holes 108, 110. The end 204 includes an extension 208 which is centered on the longitudinal axis 216 of the adapter 200, while the end 204 includes a paddle-like member 214 which is laterally offset from the axis. In the embodiment illustrated in FIGS. 11 and 12, the width of the extension 208 is less than that of the adjacent portions of the adapter 200, forming a shoulder 210 against which a stock rail can abut, as described in greater detail below. A slanted wall section 112 extends between the shoulder 210 section and the inner surface 218 of the adapter. Preferably, the surface 218 of the paddle-like member 214 is immediately adjacent to or coincident with the axis 216, so that another adapter 200 can be mounted adjacent to the member 214 with the holes 206 aligned.

Figure 13:
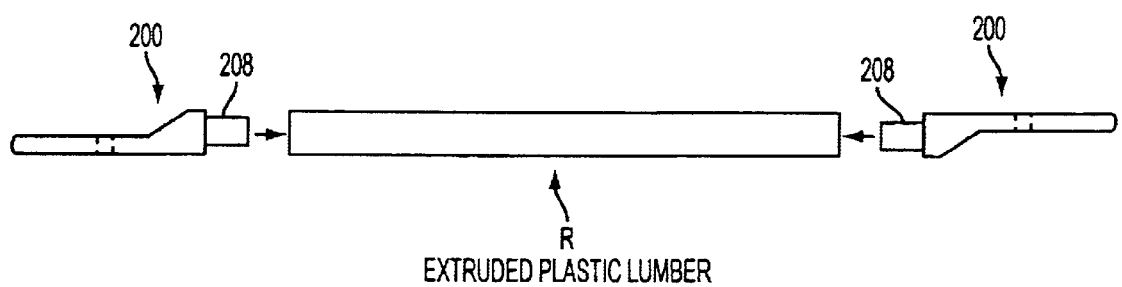
FIG. 13 illustrates a top plan view of a yet another embodiment of a fencing system in accordance with the present invention.

Alternatively, the extension 208 can be formed with a blind bore or hole (not illustrated) sized and configured to receive the end of a plain rail member inside the bore. Thus, while the embodiment illustrated in FIGS. 11 and 12 may require a hole to be formed in the end of a rail, into which rail's hole the extension 208 is fit, these two structures can effectively be reversed, with the rail not requiring a hole and the extension 208 including a hole or bore which receives the end of a rail. As illustrated in FIG. 13, a section of rail R is attached to two adapters 200, with the extensions 208 mounting to the ends of the rail R. The attachment of the extensions 208 to the ends of the rail R can be achieved by one or more of numerous systems, including cementing, melting, through-bolts or screws, or any similar system, and the present invention is not limited to any particular joining system. When the two adapters 200 are joined together with the rail R, a rail in accordance with the present invention is formed. Instead of mounting the adapters 200 as illustrated in FIG. 13, i.e., with the surfaces 218 pointing in opposite directions, the adapters can be mounted with the surfaces 218 pointed in the same direction; in this embodiment, the rails that connect to such a rail should still be connected as illustrated in FIG. 14.

FIG. 14 illustrates how the adapters 200 can be joined together using a single breakaway system of the present invention to a single post P. As described above, a bolt 122, insert or grommet 126, and an optional washer 124 are positioned together with the bolt extending through the holes 206 of two adapters 200. As illustrated in FIG. 14, the adapters are oriented relative to each other so that the surface 218 of each adapter is immediately adjacent the other surface 218 of the other adapter 200.

The rails 100, 100' and adapters 200 can be manufactured thru composite molding processes such as but not limited to resin transfer molding, compression molding, low pressure sheet molding, or open molding (sometimes referred to as spray-up or hand lay-up). Preferably, the process selected provides smooth sides to each rail and/or adapter. By way of example and not of limitation, preferably the rails are produced using low pressure sheet molding compound (LPSMC), because it can produce smooth sides and is applicable for higher volume (6000–25,000/year) production. The parts formed in this process exhibit good surface appearance and accurate dimensional control. The molding process uses a semi-processed fiberglass reinforced resin matrix. The material will flow to fill out the mold cavity once placed in a heated die and press tonnage is applied. Molding in ribs, inserts, and other details are also within the scope of the present invention. The present invention is not limited to a particular material out of which the rails and/or adapters are formed. Preferably, however, any material that can be molded, formed, pressed, or the like, such as common plastic (thermoplastic, thermoset) materials, are used.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A breakaway fencing system comprising:
   a fence rail comprising:
      a first end having a hole extending laterally therethrough;
      a second end having a hole extending laterally therethrough; and
      a middle section extending between the first end and the second end, the middle section defining a longitudinal axis;
      wherein one of the first end and the second end is laterally offset from the longitudinal axis;
   a first, deformable element positioned in a hole in one end of said rail,
   a second, force transmitting element extending through said first element and including a force transmitting portion that bears against the first element;

wherein, when the second element is secured to a fence post and when a lateral force of a predetermined magnitude acts on the rail, the first element deforms and permits the force transmitting portion of the second element to pass through the first element and release the rail.

2. The breakaway fencing system in accordance with claim 1, wherein second end is laterally offset from the longitudinal axis, and the first end has a width about one-half of said lateral offset of the second end.

3. The breakaway fencing system in accordance with claim 1, wherein only one of the first end and the second end is laterally offset from the longitudinal axis.

4. The breakaway fencing system in accordance with claim 1, wherein the cross-section of the middle section is selected to have a first stiffness to lateral deflection and a second stiffness to vertical deflection, the second stiffness being greater than the first stiffness.

5. The breakaway fencing system in accordance with claim 4, wherein the cross-section of the middle section is I-shaped.

6. The breakaway fencing system in accordance with claim 1, wherein the second end extends away from and at an angle to the longitudinal axis.

7. The breakaway fencing system in accordance with claim 1, further comprising:

a wire clip placed on the rail, the clip including a first C-shaped end, a second C-shaped end, and a middle portion connecting the first and second ends, the fist end, the second end, and the middle section receiving a portion of the rail therebetween, and at least one split ring on one of the clip first end and the clip second end.

8. The breakaway fencing system in accordance with claim 1, wherein the first element comprises a deformable insert having a throughbore and at least one flange, the flange positioned between the rail end and force transmitting portion of the second element.

9. The breakaway fencing system in accordance with claim 1, wherein the second element comprises a bolt, and the force transmitting portion comprises a head of the bolt.

10. The breakaway fencing system in accordance with claim 1, wherein the second element comprises a bolt having a head, and the force transmitting portion comprises a washer against which the bolt head bears.

11. The breakaway fencing system in accordance with claim 1, further comprising a fence post, the second element secured to the post.

* * * * *